United States Patent [19]

Wen

[11] Patent Number: 4,847,895
[45] Date of Patent: Jul. 11, 1989

[54] CONTROLLABLE ANNUNCIATOR USING RING SIGNAL

[75] Inventor: Sayling Wen, Taipei, Taiwan

[73] Assignee: Inventa Electronics Co., Ltd., Taipei, Taiwan

[21] Appl. No.: 53,331

[22] Filed: May 21, 1987

[51] Int. Cl.$^4$ ............................................. H04M 1/66
[52] U.S. Cl. ..................................... 379/199; 379/375
[58] Field of Search ............... 379/199, 373, 374, 375, 379/387, 214, 88, 93, 387, 82

[56] References Cited

U.S. PATENT DOCUMENTS

| | | | |
|---|---|---|---|
| 3,876,836 | 4/1975 | Langan | 379/373 X |
| 4,409,439 | 10/1983 | Gumble | 379/188 |
| 4,459,435 | 7/1984 | Foldvary et al. | 379/373 X |
| 4,674,115 | 6/1987 | Kaleita et al. | 379/199 X |

FOREIGN PATENT DOCUMENTS 2160390  12/1985  United Kingdom ................. 379/82

Primary Examiner—James L. Dwyer
Attorney, Agent, or Firm—Ladas & Parry

[57] ABSTRACT

This invention provides a central processing unit having read only memory for storing permanently the firmware and random access memory for storing the protocol which can be changed by user via the keyboard when need, which also has a detector for counting the ring signal inputted from the line and sending it to the CPU. When the count of the ring signal and the interval between the hang-up and dial are all met, the protocol stored in the RAM of the CPU and the control device enabled by the CPU via the output terminal send the tone signal to the ring apparatus for signaling the user.

5 Claims, 5 Drawing Sheets

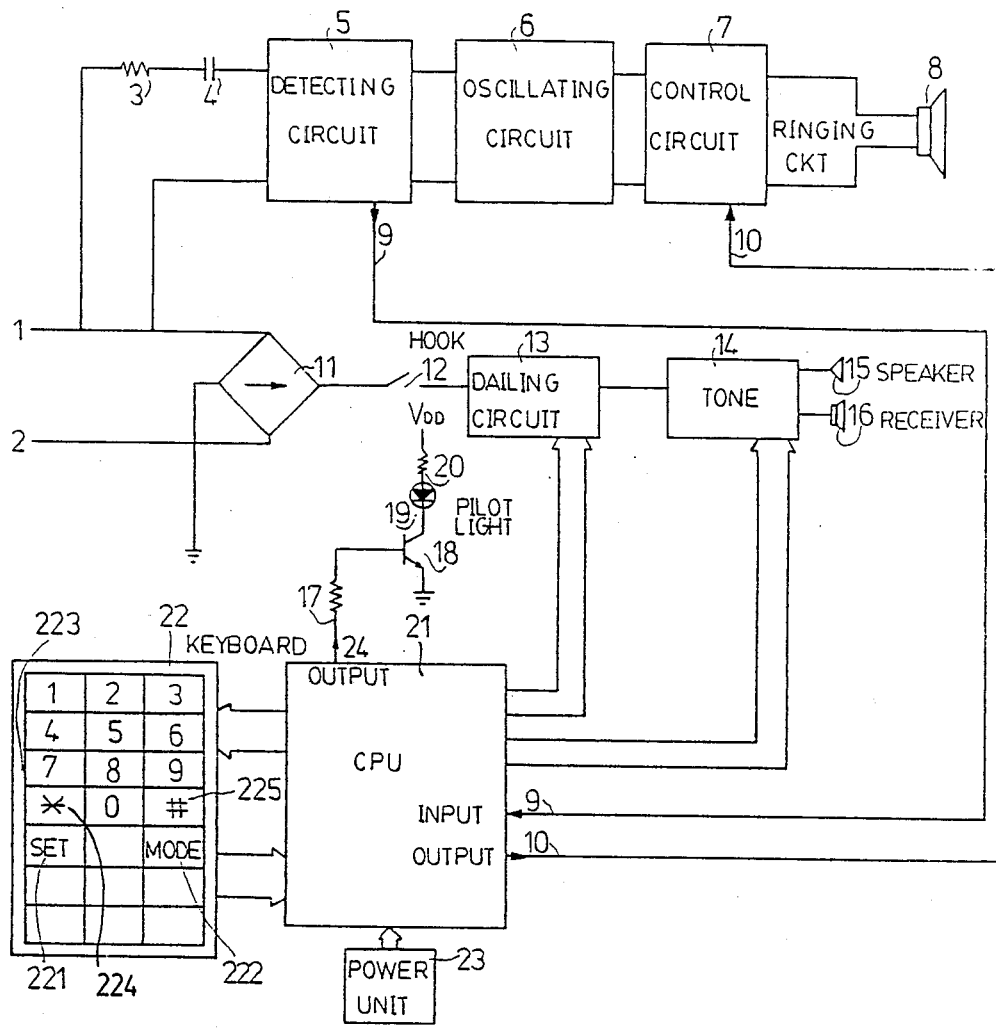
F I G. 1

CONTROLLABLE ANNUNCIATOR USING RING SIGNAL

BACKGROUND OF THE INVENTION

This invention relates to an annunciator and more particularly to a controllable annunciator using ring signal.

It is well known that a telephone rings to signal a user. However the user cannot make a choice as to whether or not he or she wishes to receive the call before the telephone rings. For example, when a telephone rings in the middle of the night, the user cannot be sure whether the call should be answered or ignored. For this particular reason, conventional telephones can be equipped with a recorder as the receiver to give the user an option as to whether or not he wishes to answer a call, thereby reducing the disturbance caused by an unwanted call.

It has been noted that telephone answering recorders have the disadvantages of high cost, complicated circuit arrangement, etc.

SUMMARY OF THE INVENTION

It is, therefore, the main object of the present invention to provide a controllable annunciator which is programmed to use the ring signal as the entered code permits for obviating those disadvantages of conventional telephone.

The main feature of the present invention is to provide a controllable annunciator for filtering out non-desired callers. This is accomplished, by requiring the caller to place a number of calls to the user and during each call, the phone is allowed to "ring" a pre-established (or agreed) number of times before the caller hangs up. During this stage (or stages), the users phone does not audibly ring. If the caller satisfies this "protocol", in the next call, the users phone responds by actually ringing, alerting the user to answer the phone.

Another feature of the present invention is to provide a protocol whose stage is 1 or more when needed in order to prevent the protocol from detecting.

BRIEF DESCRIPTION OF THE DRAWINGS

Those and other objects, features and advantages of the controllable annunciator according to the present invention will become apparent from the following detailed description of the preferred embodiment of the present invention with reference to the accompanying drawings, wherein:

FIG. 1 is a block diagram illustrating the controllable annunciator of the present invention;

DETAILED DESCRIPTION OF THE PREFERRED EMBODIMENT

Figure 2:
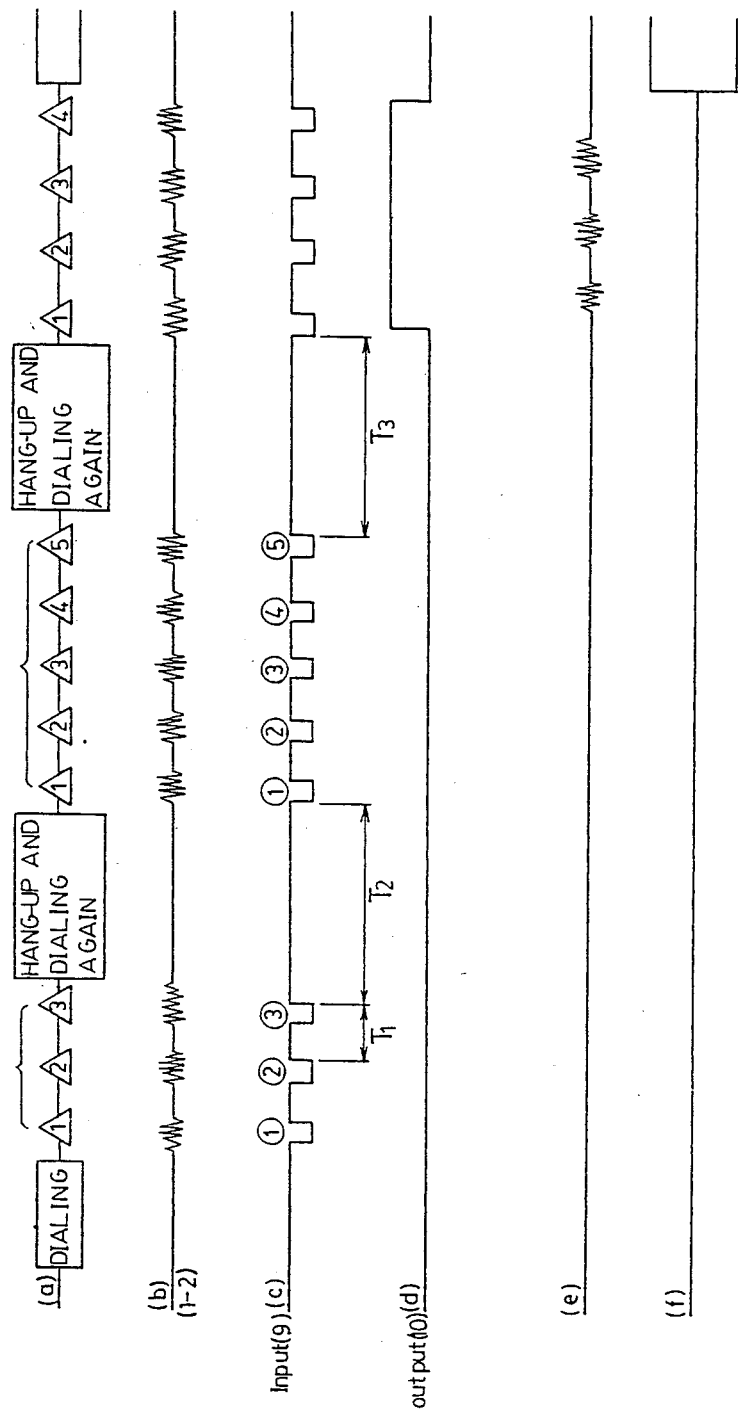
FIGS. 2(a-f) is a timing diagram which shows the ring signal and intervals are all met to the screen mode according to the present invention.

Referring now to FIG. 1 which is a block diagram illustrating the preferred embodiment of the controllable annunciator of this invention, the controllable annunciator comprises a central processing unit 21 (abbreviated CPU) having read only memory (ROM) and random access memory (RAM) thereof; a keyboard 22 including a set of numerical keys 223, a * key 224, a # key 225, a mode key 222 and a set key 221; a power means 23; a dial means 13 for dialing; a tone means 14; a pole means 11; a detecting means 5 which detects ring signals occuring on line 1 for counting the number of ring signals and sends data of the total count of ring signals to input terminal 9 of CPU 21; an oscillator means 6 which receives outputs of the detecting means 5; a control means 7 which receives signals produced by the oscillator means 6 and is enabled or disenabled by the output signal on line 10 generated by CPU 21; a ring means 8; a speaker 15; a receiver 16; and a pilot light 19.

The keyboard 22 is connected to the CPU 21 for sending the data produced by the keyboard 22 so as to designate the mode in accordance with a code signal outputted from the keyboard 22. The dial means 13 and the tone means 14 are respectively connected to the CPU 21 for receiving the data outputted from the CPU 21. The pilot light 19 connected to the collector terminal of the transistor 18 whose base terminal is connected to the output terminal 24 of the CPU 21 via the resistor 17 is enabled by the signal outputted from the CPU 21 via the output terminal 24 so as to turn the lamp 19 on when the operating mode is a screening mode", and the flag is "1", or to turn the lamp 19 off when the operating mode is a "normal mode", and the flag is "0", or to flash the lamp 19 when the operating mode is a programming mode", and the flag is "2".

The detecting means 5 is connected to the line 1 for counting the ring signals inputted from the line 1 via resistor 3 and capacitor 4 and then sends the total count of the ring signals to the CPU 21 via input terminal 9. The oscillator means 6 is connected to the detecting means 5. Accordingly, the oscillator means 6 is triggered by signal which is inputted from the detecting means 5 to generate the tone or ringing can't be heard by the user if it passes through the control mean 7 to ring means 8. The output terminal 10 of the CPU 21 connected to the control means 7 to enable or disable the control means 7 to output the aforementioned tone signal. Consequently, to means 8.

In operation, the set mode of the above-described controllable annunciator arises through a sequence of the mode key 222; the set key 221; the * key 224 and the numerical key 223. For example, * 3 or * 3 4) may set the protocol of the first stage and the protocol. The * key 224 and the numerical key 223 ( for example, * 5 6 ) may set the protocol of the second stage and the protocol. Additional stages can be used when needed. The #key 225 and the numerical key 223 ( for example, #30 ) may set the maximum interval between the hang-up and the following ring-call. The set key 221 ends the set mode, so the mode shifts to the screening mode. The mode key 222 changes the mode between "normal mode" and the "screening mode" when the pilot light 19 is dimmed or flashed.

The set mode described above is stored in the read only memory of the CPU 21.

Therefore, when signals inputted from the lines 1 are sent to the detecting means 5 and then counted, the count of the signal supplied from the detect means 5 to the input terminal 9 of the CPU 21 and checked by the protocol stored in the RAM of the CPU 21. The signals which correspond to the protocol cause the signals generated by the CPU 21 to be received by the control means 7 via the output terminal 10 of the CPU 21, and the control means 7 is enabled by the signals of the output terminal of the CPU 21 to produce a ring for signaling the user by way of the ring means 8.

The operational sequence of the screen mode shown in FIG. 2 will be discussed in detail as follows.

Waveform (a) shows the operation of the caller, the caller dials and then hangs up after the count of the ring back tone is met to the protocol of the first stage ( for example,the count is 3). Next, dialing repeatedly he receives the count of the ring back tone set by the protocol of the second stage ( for example, the count is 5) and hangs up. If the counts of the ring back tone and the interval between the hang-up and the dialing are all met in the protocol stored in the RAM of the CPU 21, the ring means 8 can ring for signaling the user.

Waveform (b) shown the voltage and the frequency between the line 1, 2 are between 40 and 130 Vrms and between 17 and 68 Hz.

Waveform (c) shows the input signals generated by the detecting means 5 which is synchronous with the ring signal inputted from the line 1, wherein the duration of T1 is shorter than the duration of T2, and the duration of T1 is shorter than the duration of T3, and the duration of T3 is shorter than the duration of Tmax which the maximum interval between the hang-up and the redialing. The duration of T1 is shorter than the duration of T2 and of T3 so that the count of ring back tone can be defined clearly. For example, if the count of the ring back tone is 3, the input signal must be 3. This is to permit the the output signal generated by the CPU 21 to feed to the control means 7 for enabling the control means 7 when T2 and T3 are shorter then Tmax.

Waveform (d) which shows the output signal sent from the CPU 21 to the control means 7 via the output terminal 10 of the CPU 21 in the screen mode is logic "0" to either enable or disenable the control means 7.

Waveform (e) is to show the ring signal permitted to produce ring which is enabled by the control means 7 via the ring means 8.

Waveform (f) is to show the operation of the user.

Figure 3:
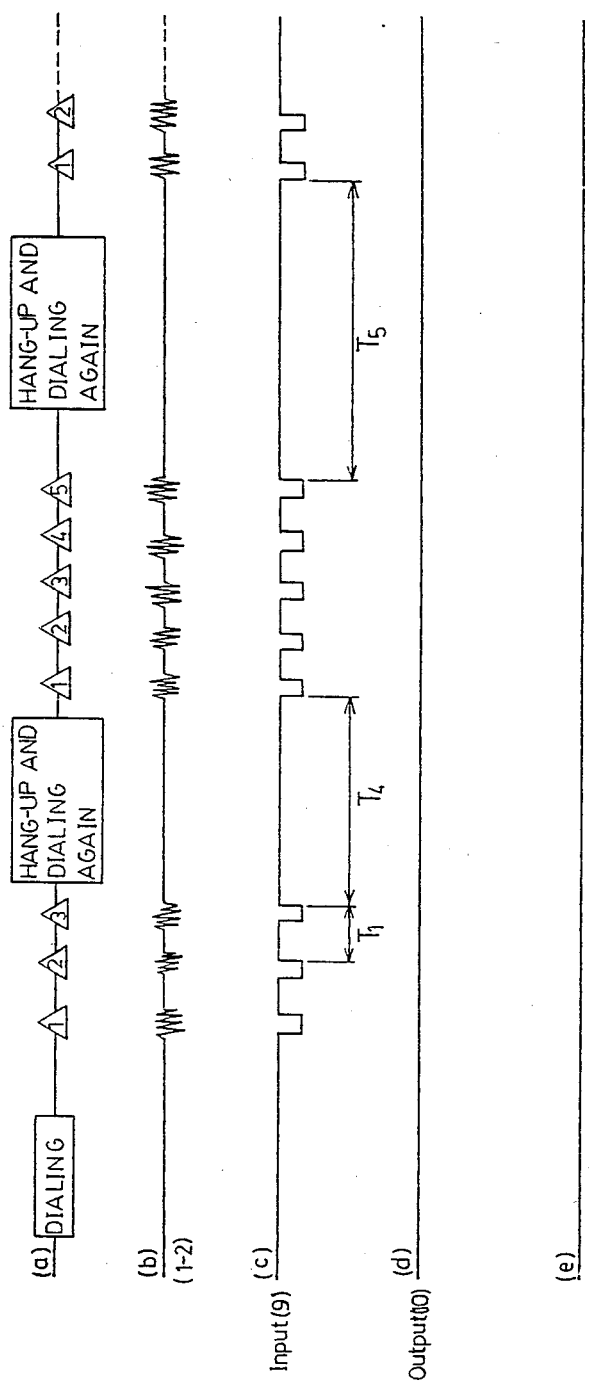
FIGS. 3(a-e) is a timing diagram which shows the ring signal is met to the screen mode, but the interval are not.

As shown in FIG. 3, waveform (c) represents that T4 is greater than T1, and T4 is shorter than Tmax, T5 is larger than Tmax, so the ring cannot be generated.

Figure 4:
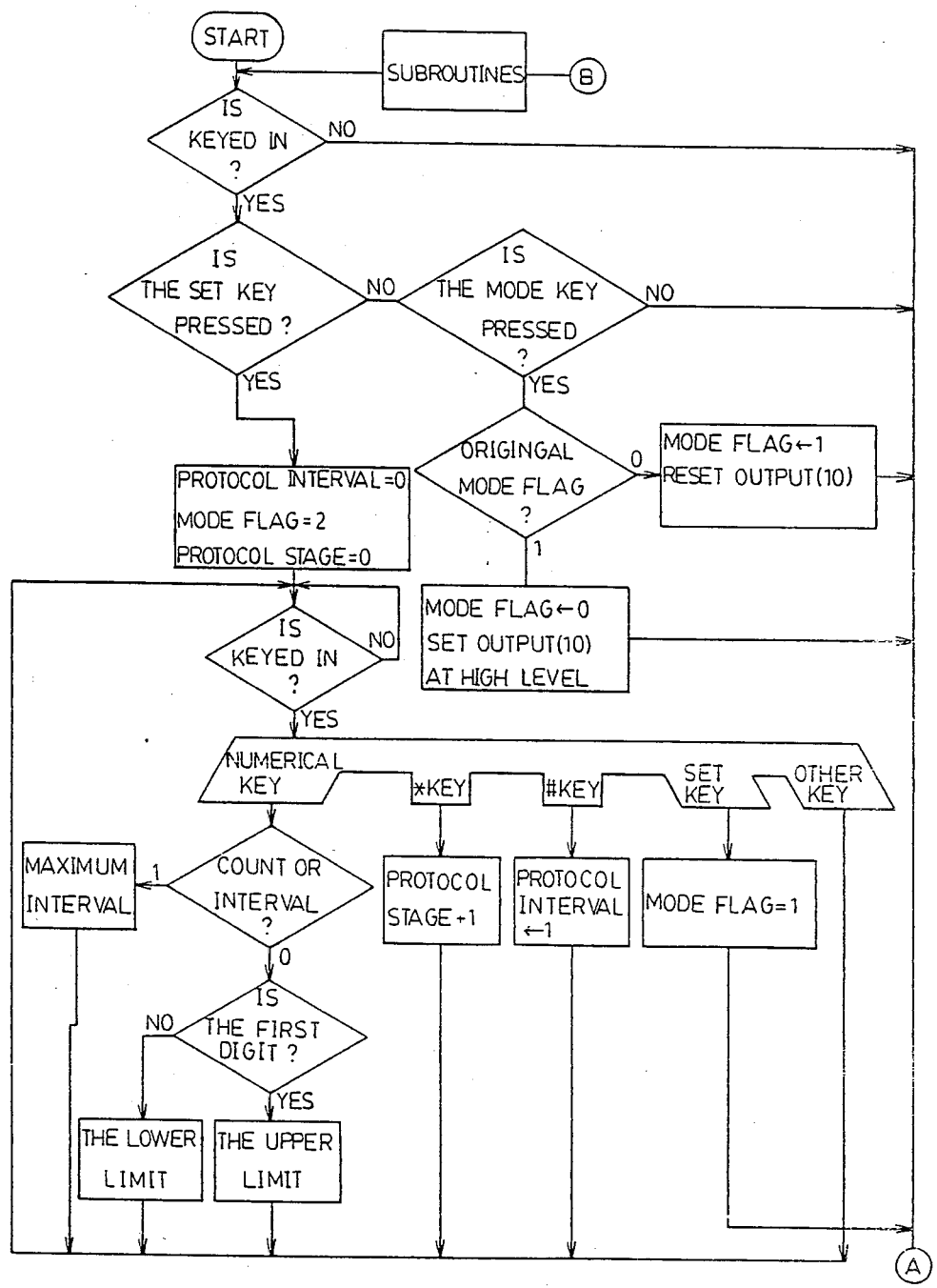
FIG. 4 is a flow diagram of the operational sequence of the normal mode according to the present invention.
Figure 5:
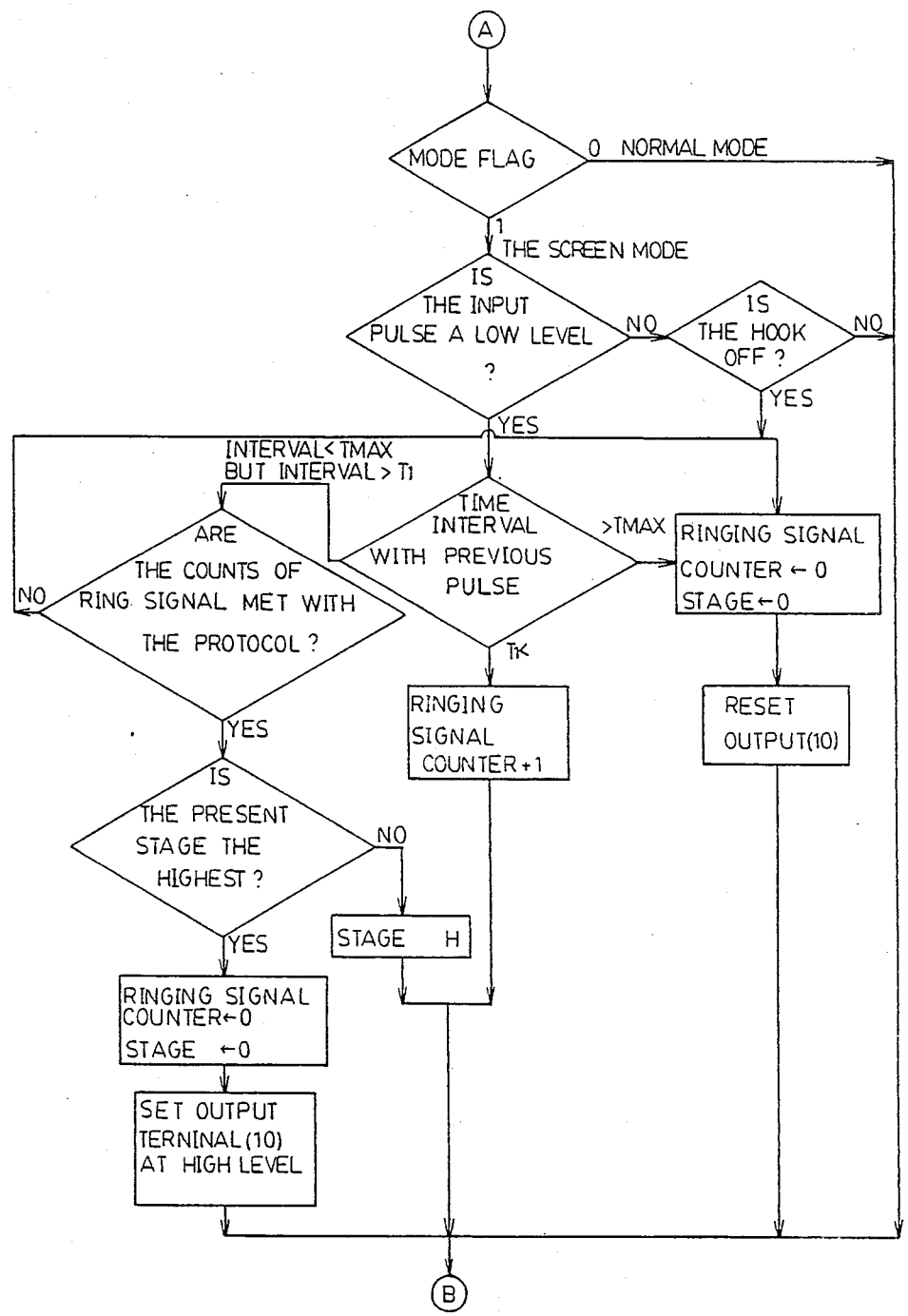
FIG. 5 is a flow diagram of the operational sequence of the screen mode according to the present invention.

There are flow diagrams showing the set mode and the screen mode which can be stored in the ROM of the CPU 21 as shown in FIG. 4 and FIG. 5, respectively.

It is to be noted that the controllable annunciator of the present invention has been described by way of preferred embodiment. It is possible that other changes or modifications may be made by those skilled in the art without departing from the spirit and scope of the present invention.

What is claim is:

1. A method of screening telephone calls comprising the steps of:
   (a) electronically counting the number of incoming rings occurring during a time interval during which individual rings occur within a predetermined time of each other;
   (b) electronically comparing the number of rings detected in step (a) to a user selectable value;
   (c) electronically measuring the elapsed time from the last ring detected in step (a) to a subsequent ring;
   wherein steps (a), (b) and (c) comprise a stage and said method comprises two or more stages such that steps (a), (b) and (c) are repeated once for each stage, the user selectable value being individually selectable for each stage, and further including the step of:
   (d) causing a telephone to audibly ring in response to a subsequent ring only if:
      (i) the result of the comparison of step (b) is that the number of rings equals the user selectable value and
      (ii) the elapsed time of step (c) does not exceed predetermined values for each stage, but is longer than said predetermined time.

2. A method of screening telephone calls, the method including at least two stages and wherein each of said at least two stages comprise the following steps:
   (a) electronically counting the number of incoming rings occurring during a time interval during which individual rings occur within a predetermined time of each other;
   (b) electronically comparing the number of rings detected in step (a) to a selectable, preset value; and
   (c) electronically measuring the elapsed time from the last ring detected in step (a) to a subsequent ring; wherein the selectable value of step (b) is individually selectable for each stage and further including the step of causing the telephone to audibly ring only if:
      (i) the result of the comparison of step (b) is that the number of rings equals the selectable value for each stage and
      (ii) the elapsed time of step (c) does not exceed predetermined values for each stage.

3. A method of screening telephone calls comprising the steps of:
   (a) electronically counting the number of incoming rings occurring during a time interval during which individual rings occur within a predetermined time of each other;
   (b) electronically comparing the number of rings detected in step (a) to a first user selectable value;
   (c) electronically measuring the elapsed time from the last ring detected in step (a) to a subsequent ring; and
   wherein steps (a), (b) and (c) comprise a stage and said method comprises two or more stages such that steps (a), (b) and (c) are repeated once for each stage, and further including the step of:
   (d) causing a telephone to audibly ring in response to a subsequent ring only if:
      (i) the result of the comparison of step (b) is that the number of rings equals the first user selectable value for each stage and
      (ii) the elapsed time of step (c) does not exceed a second user selectable value for each stage, but is longer than said predetermined time.

4. The method of claim 3 wherein the first and second selected values are individually selectable for each stage.

5. A controllable annunciator having control circuit means, ringing circuit means, dialing circuit means and tone emitting circuit means, as well as a keyboard having a "set" key and a "mode" key separately provided thereon, all respectively arranged for handling phone-call signal operations comprising:
   a central processing means, which is electrically coupled with the dialing circuit means and the tone emitting circuit means, having an output connected to the control circuit means for providing controlling signals therefrom and including memory means for storing a permanent program of a "set" mode, a screening mode, or programming mode and a screening protocol which is a constant, but can be changed by the user when necessary; and a detecting means coupled with a telephone line and electrically connected to an input of said central processing means for sending a total count of ring signals to said central processing means for providing output signal therefrom to enable the control circuit means to cause the ringing circuit means to produce a ringing sound in accordance with a mode selected by the user through the "set" key and the "mode" key on the keyboard.

* * * * *